Patented Feb. 9, 1932

1,844,400

UNITED STATES PATENT OFFICE

WILLIAM H. KOBBÉ, OF NEW YORK, N. Y.

SULPHUR-CONTAINING OIL COMPOSITION AND METHOD OF MAKING THE SAME

No Drawing. Application filed January 24, 1928. Serial No. 249,210.

This invention relates generally to improvements in sulphur-containing oils and greases. More particularly the invention provides a stable, high-sulphur lubricating oil especially adapted for use as a "cutting" oil in metal working.

In practicing my improved method, a terpene is treated with sulphur, and the resulting sulphur base is incorporated with petroleum lubricating oil and/or other materials having lubricating properties. Pine oil is the preferred terpene, but turpentine, pinene, terpineol, polymerized pine oil, and other terpenes or admixtures of the same may be used.

The following example is illustrative:

One part by weight of elementary sulphur, either crude or refined, is placed in a heating vessel. Two parts of pine oil, preferably steam distilled, are then added to the vessel and heat is applied. As the temperature of the charge rises, the sulphur fuses, forming a layer on the bottom of the vessel with a supernatant layer of the pine oil. When a temperature of approximately 178° C. has been reached, as indicated by a thermometer in the pine oil layer, ebullition commences and the temperature rapidly rises to about 190° C. The sulphur passes completely into the pine oil, forming an apparently homogeneous mass of a wine red color. Heating of the charge is continued for a "cooking" period of usually about thirty minutes, the temperature gradually rising until it has reached 200-210° C. It is advantageous to regulate the heating to maintain the charge at not to exceed 250° C.

After the "cooking" period, the hot charge is mixed with about 25 parts by weight of the oil to be sulphurized which is at a temperature of not less than 100° C., and preferably above the melting point of sulphur, or 120 to 140° C. The resulting product is apparently homogeneous and ordinarily has a color varying from almost the intial color of the oil to amber or a deep wine red.

Sulphur may crystallize from the sulphur base if allowed to stand for several days at ordinary temperature, or if cooled rapidly. However, sulphur does not separate appreciably from the finished oil product on account of temperature change, not even when the product is cooled to 0° C. or lower. The color of the product is also substantially permanent.

In most instances I prefer to use a paraffin base mineral oil or pale color, such as pale spindle oil, with a specific gravity of about .885. When using oils of this type for admixture with the sulphur base described, the mixture produced is brilliant, transparent or translucent, and substantially free from bloom or fluorescense.

Instead of the spindle oil referred to, other petroleum lubricating oils, or lubricating vegetable, fish and/or animal oils, or mixtures of the same, may be used either alone or in admixture with petroleum oil to make a product of any desired specific gravity, sulphur content, or viscosity ranging from a very mobile oil to a grease. For example, equal parts by volume of a sulphurized spindle oil may be added to a red engine oil having a Saybolt viscosity of about 210 at 100° F.

Relatively high percentages of sulphur can be permanently incorporated in oils by the method described, as compared with direct solution of sulphur by the oil, or direct reaction of the sulphur and oil. From one to three percent of sulphur in the final product is easily obtained, and eight percent or somewhat more can be secured by taking care to "cook" the admixed oil and sulphur base for at least 30 minutes or more in the case of oils which retain sulphur with difficulty. For such oils, also, it is desirable to use a higher proportion of pine oil to sulphur than the one-to-two ratio specified above. Three or four parts of pine oil may be used with advantage in this connection.

It will be understood that the foregoing description is merely illustrative of the invention, and that various changes and alternative procedures and proportions may be adopted within the scope of the appended claims, in which it is my intention to claim all novelty inherent in the invention as broadly as the prior art permits.

I claim:

1. An oleaginous composition comprising oily material having lubricating properties and the product obtained by heating a terpene with sulphur.

2. A lubricating composition comprising a lubricating oil and the product obtained by heating a terpene with sulphur.

3. A lubricating oil comprising a petroleum hydrocarbon having lubricating properties, and the product obtained by heating a terpene with sulphur.

4. An oleaginous composition comprising an oily material having lubricating properties and the product obtained by heating pine oil with sulphur.

5. A lubricating oil comprising a petroleum hydrocarbon having the lubricating characteristics of spindle oil, and the product obtained by heating pine oil with sulphur.

6. A lubricating oil composition comprising about 25 parts by weight of oil having lubricating properties in admixture with a sulphur base formed by heating 1 part by weight of sulphur with 2 parts by weight of a terpene.

7. A lubricating oil composition comprising a petroleum lubricating oil having sulphur incorporated therein through the agency of a terpene, and characterized by brilliance and translucence.

8. In the method of making a sulphur-containing oleaginous composition having lubricating properties, the improvement which comprises heating sulphur with a terpene to form a sulphur base, and admixing the sulphur base with oleaginous material.

9. In the method of making a sulphurized lubricating oil composition, the improvement which comprises heating sulphur with pine oil to form a sulphur base, and admixing the sulphur base with petroleum lubricating oil.

10. In the method of making a sulphurized lubricating oil composition, the improvement which comprises heating sulfur with pine oil to a temperature of approximately 178° C. to secure a homogeneous mixture, thereafter continuing the heating at higher temperature, not above 210° C., and incorporating the sulphur base thus formed with a lubricating oil at a temperature not less than 100° C.

WILLIAM H. KOBBÉ.